(12) United States Patent
Hu et al.

(10) Patent No.: US 12,323,849 B2
(45) Date of Patent: Jun. 3, 2025

(54) METHOD AND APPARATUS FOR INDICATING QoS FLOW INFORMATION

(71) Applicant: LENOVO (BEIJING) LIMITED, Beijing (CN)

(72) Inventors: Jie Hu, Beijing (CN); Jing Han, Beijing (CN); Haiming Wang, Beijing (CN); Lianhai Wu, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 547 days.

(21) Appl. No.: 17/765,384

(22) PCT Filed: Oct. 14, 2019

(86) PCT No.: PCT/CN2019/111044
§ 371 (c)(1),
(2) Date: Mar. 30, 2022

(87) PCT Pub. No.: WO2021/072597
PCT Pub. Date: Apr. 22, 2021

(65) Prior Publication Data
US 2022/0369154 A1    Nov. 17, 2022

(51) Int. Cl.
*H04W 28/02* (2009.01)
*H04W 4/40* (2018.01)

(52) U.S. Cl.
CPC ... *H04W 28/0268* (2013.01); *H04W 28/0263* (2013.01); *H04W 4/40* (2018.02)

(58) Field of Classification Search
CPC ..... H04W 24/02; H04W 16/28; H04W 28/02; H04W 28/06; H04W 72/11; H04W 76/28;
(Continued)

(56) References Cited

U.S. PATENT DOCUMENTS

| 11,641,570 B2* | 5/2023 | Wang .................... H04W 76/27 370/329 |
| 2018/0054237 A1 | 2/2018 | Tseng et al. |

(Continued)

FOREIGN PATENT DOCUMENTS

| CN | 109845312 A | 6/2019 |
| WO | 2019168750 A1 | 9/2019 |

OTHER PUBLICATIONS

International Searching Authority, "Written Opinion of the International Searching Authority," PCT/CN2019/111044, Jul. 10, 2020, pp. 1-4.
(Continued)

*Primary Examiner* — Iqbal Zaidi
(74) *Attorney, Agent, or Firm* — Kunzler Bean & Adamson

(57) ABSTRACT

Embodiments of the present application are related to a method and apparatus for indicating QoS flow information. A method according to an embodiment of the present application includes: mapping at least one data packet to a QoS flow, wherein the QoS flow is associated with a set of QoS parameters; mapping the QoS flow to a sidelink radio bearer (SLRB) based on index configuration information, wherein the index configuration information indicates a set of indexes associated with each QoS parameter of the set of QoS parameters; and transmitting configuration information of the SLRB and mapping index information, wherein the mapping index information indicates a quantization index of each QoS parameter of the set of QoS parameters, and the set of QoS parameters is quantified to the mapping index information based on the index configuration information.

16 Claims, 6 Drawing Sheets

(58) Field of Classification Search
CPC ... H04W 64/00; H04B 7/0456; H04B 7/0452; H04B 7/06
See application file for complete search history.

(56) References Cited

U.S. PATENT DOCUMENTS

| | | | |
|---|---|---|---|
| 2021/0212096 A1* | 7/2021 | Hassan Hussein ... | H04W 72/20 |
| 2022/0124772 A1* | 4/2022 | Xu ..................... | H04W 76/14 |

OTHER PUBLICATIONS

3GPP, 3rd Generation Partnership Project; Technical Specification Group Radio Access Network; NR; Study on NR Vehicle-to-Everything (V2X) (Release 16), 3GPP TR 38.885 V16.0.0 (Mar. 2019), pp. 1-122.

* cited by examiner

| | |
|---|---|
| D/C | one set index indicating a set of a specific quantization index of each QoS parameter of the set of QoS parameters, or a plurality of separated indexes indicating a specific quantization index of each QoS parameter of the set of QoS parameters |
| DATA | |
| ...... | |
| DATA | |

FIG. 7

| | |
|---|---|
| D/C | one set index indicating a set of a specific quantization index of each QoS parameter of the set of QoS parameters, or a plurality of separated indexes indicating a specific quantization index of each QoS parameter of the set of QoS parameters |

FIG. 8

METHOD AND APPARATUS FOR INDICATING QoS FLOW INFORMATION

TECHNICAL FIELD

Embodiments of the present application generally relate to wireless communication technology, especially to a method and an apparatus for indicating quality of service (QoS) flow information.

BACKGROUND

Vehicle to everything (V2X) has been introduced into 5G wireless communication technology. In terms of a channel structure of V2X communication, the direct link between two user equipments (UEs) is called a sidelink. Sidelink is a long-term evolution (LTE) feature introduced in 3GPP (3rd Generation Partnership Project) Release 12, and enables a direct communication between proximal UEs, and data does not need to go through a base station (BS) or core network. 3GPP 5G new radio (NR) V2X service adFopts a QoS flow structure. Details of a QoS flow transmitting procedure between UEs have not been discussed in 3GPP 5G NR technology yet.

SUMMARY

Some embodiments of the present application provide a method. The method includes: mapping at least one data packet to a QoS flow, wherein the QoS flow is associated with a set of QoS parameters; mapping the QoS flow to a sidelink radio bearer (SLRB) based on index configuration information, wherein the index configuration information indicates a set of indexes associated with each QoS parameter of the set of QoS parameters; and transmitting configuration information of the SLRB and mapping index information, wherein the mapping index information indicates a quantization index of each QoS parameter of the set of QoS parameters, and the set of QoS parameters is quantified to the mapping index information based on the index configuration information.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method for transmitting configuration information of SLRB and mapping index information.

Some embodiments of the present application provide a method. The method includes: receiving configuration information of a sidelink radio bearer (SLRB) and mapping index information, wherein the mapping index information indicates a quantization index of each QoS parameter of a set of QoS parameters, and the set of QoS parameters is associated with a QoS flow from which the SLRB is mapped; establishing the SLRB based on the configuration information; and remapping the SLRB to the QoS flow based on the mapping index information and index configuration information, wherein the index configuration information indicates a set of indexes associated with each QoS parameter of the set of QoS parameters.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method for remapping SLRB to the QoS flow.

Some embodiments of the present application provide a method. The method includes: configuring index configuration information, wherein the index configuration information indicates a set of indexes associated with each QoS parameter of a set of QoS parameters; and transmitting the index configuration information, wherein configuring the index configuration information includes: dividing each QoS parameter of the set of QoS parameters per a specific value or per a range; and defining an index corresponding to a specific value of a QoS parameter, or an index value corresponding to a range of a QoS parameter.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement a method, such as one abovementioned method for configuring index configuration information.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 7 illustrates an exemplary service data adaptation protocol (SDAP) data packet data unit (PDU) format in accordance with some embodiments of the present application;

FIG. 8 illustrates an exemplary SDAP control PDU format in accordance with some embodiments of the present application.

DETAILED DESCRIPTION

Figure 1:
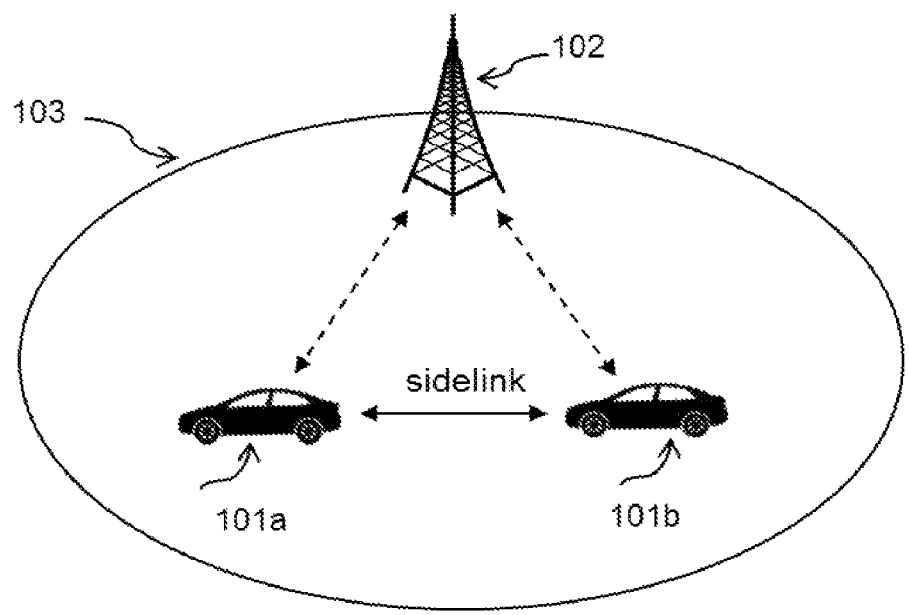
FIG. 1 illustrates an exemplary V2X communication system in accordance with some embodiments of the present application.

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

UE(s) under NR V2X scenario may be referred to as V2X UE(s). A V2X UE, which transmits data according to sidelink resource(s) scheduled by a base station (BS), may be referred to as a UE for transmitting, a transmitting UE, a transmitting V2X UE, a Tx UE, a V2X Tx UE, or the like. A V2X UE, which receives data according to sidelink resource(s) scheduled by a BS, may be referred to as a UE for receiving, a receiving UE, a receiving V2X UE, a Rx UE, a V2X Rx UE, or the like.

V2X UE(s) may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like.

According to some embodiments of the present application, V2X UE(s) may include a portable wireless communication device, a smart phone, a cellular telephone, a flip phone, a device having a subscriber identity module, a personal computer, a selective call receiver, or any other device that is capable of sending and receiving communication signals on a wireless network.

According to some embodiments of the present application, V2X UE(s) includes wearable devices, such as smart watches, fitness bands, optical head-mounted displays, or the like. Moreover, V2X UE(s) may be referred to as a subscriber unit, a mobile, a mobile station, a user, a terminal, a mobile terminal, a wireless terminal, a fixed terminal, a subscriber station, a user terminal, or a device, or described using other terminology used in the art. V2X UE(s) may communicate directly with BS(s) via uplink (UL) communication signals.

A BS under NR V2X scenario may be referred to as a base unit, a base, an access point, an access terminal, a macro cell, a Node-B, an enhanced Node B (eNB), a gNB, a Home Node-B, a relay node, a device, a remote unit, or by any other terminology used in the art. A BS may be distributed over a geographic region. Generally, a BS is a part of a radio access network that may include one or more controllers communicably coupled to one or more corresponding base stations.

A BS is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicably coupled to a mobility management entity (MME), a serving gateway (SGW), and/or a packet data network gateway (PGW).

A BS may serve a number of V2X UEs within a serving area, for example, a cell or a cell sector via a wireless communication link. A BS may communicate directly with one or more of V2X UEs via communication signals. For example, a BS may serve V2X UEs within a macro cell.

Sidelink communication between a Tx UE and a Rx UE under NR V2X scenario includes groupcast communication, unicast communication, or broadcast communication.

Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

FIG. 1 illustrates an exemplary V2X communication system in accordance with some embodiments of the present application.

As shown in FIG. 1, the V2X communication system includes a base station, i.e., BS 102 and some V2X UEs, i.e., UE 101*a* and UE 101*b*. UE 101*a* and UE 101*b* may be configured to perform sidelink unicast transmission, sidelink groupcast transmission, or sidelink broadcast transmission. It is contemplated that, in accordance with some other embodiments of the present application, a V2X communication system may include more or fewer BSs, and more or fewer V2X UEs. Moreover, it is contemplated that names of V2X UEs (which represent a Tx UE, a Rx UE, and etc.) as illustrated and shown in FIG. 1 may be different, e.g., UE 101*c*, UE 104*f*, and UE 108*g* or the like.

In addition, although each V2X UE as shown in FIG. 1 is illustrated in the shape of a car, it is contemplated that a V2X communication system may include any type of UE (e.g., a roadmap device, a cell phone, a computer, a laptop, IoT (internet of things) device or other type of device) in accordance with some other embodiments of the present application.

According to some embodiments of FIG. 1, UE 101*a* functions as a Tx UE, and UE 101*b* functions as a Rx UE. UE 101*a* may exchange V2X messages with UE 101*b* through a sidelink, for example, PC5 interface as defined in 3GPP TS 23.303. UE 101*a* may transmit information or data to other UE(s) within the V2X communication system, through sidelink unicast, sidelink groupcast, or sidelink broadcast. For instance, UE 101*a* transmits data to UE 101*b* in a sidelink unicast session. UE 101*a* may transmit data to UE 101*b* and other UEs in a groupcast group (not shown in FIG. 1) by a sidelink groupcast transmission session. Also, UE 102 may transmit data to UE 101*b* and other UEs (not shown in FIG. 1) by a sidelink broadcast transmission session.

Alternatively, according to some other embodiments of FIG. 1, UE 101*b* functions as a Tx UE and transmits V2X messages, UE 101*a* functions as a Rx UE and receives the V2X messages from UE 101*b*.

Both UE 101*a* and UE 101*b* in the embodiments of FIG. 1 may transmit information to BS 102 and receive control information from BS 102. BS 102 may define one or more cells, and each cell may have a coverage area. As shown in FIG. 1, both UE 101a and UE 101b are within a coverage area 103 of BS 102.

BS 102 as illustrated and shown in FIG. 1 is not a specific base station, but may be any base station(s) in the V2X communication system. For example, if the V2X communication system includes two BSs 102, UE 101 being within a coverage area of any one the two BSs 102 may be called as a case that UE 101 is within a coverage of BS 102 in the V2X communication system; and only UE 101 being outside of coverage area(s) of both BSs 102 can be called as a case that UE 101 is outside of the coverage of BS 102 in the V2X communication system.

Figure 2:
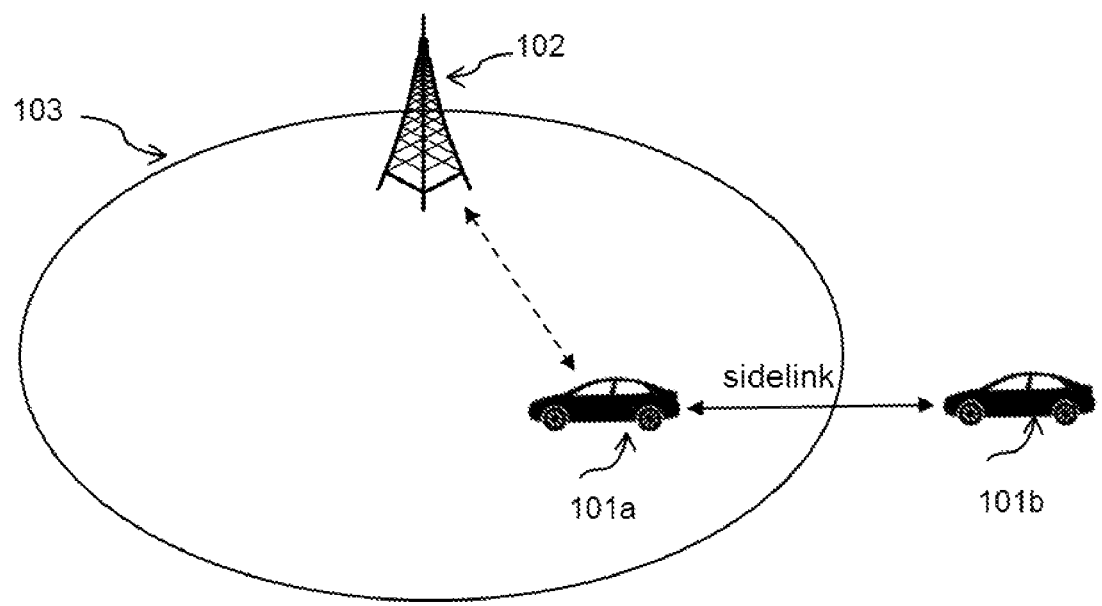
FIG. 2 illustrates another exemplary V2X communication system in accordance with some embodiments of the present application.

FIG. 2 illustrates another exemplary V2X communication system in accordance with some embodiments of the present application. The V2X communication system as illustrated and shown in FIG. 2 is similar to that as illustrated and shown in FIG. 1. All the above described contents related to the embodiments in FIG. 1 are applicable for the embodiments in FIG. 2 except that UE 101a is within the coverage area 103 of BS 102 whereas UE 101b is outside of the coverage area 103 of BS 102.

Similar to the embodiments in FIG. 1, UE 101a in the embodiments in FIG. 2 may exchange V2X messages with BS 102, and exchange V2X messages with UE 101b through a sidelink, for example, PC5 interface as defined in 3GPP TS 23.303. Since UE 101b is outside of the coverage area 103 associated with BS 102, it cannot exchange messages with BS 102. During communications between UE 101a and UE 101b, UE 101a may function as a Tx UE and transmit V2X messages, UE 101b may function as a Rx UE and receive the V2X messages from UE 101a, and vice versa.

In 3GPP 5G NR V2X technology, a QoS flow structure is adopted. In a V2X communication system, a QoS flow may also be named as a PC5 QoS flow. Service Data Adaptation Protocol (SDAP) layer is also introduced for Application/Service layer of NR V2X, so that a Tx UE can map PC5 QoS flow to Sidelink Radio Bearer (SLRB). On the other hand, a Rx UE needs to remap SLRB to PC5 QoS flow by SDAP entity.

Figure 3:
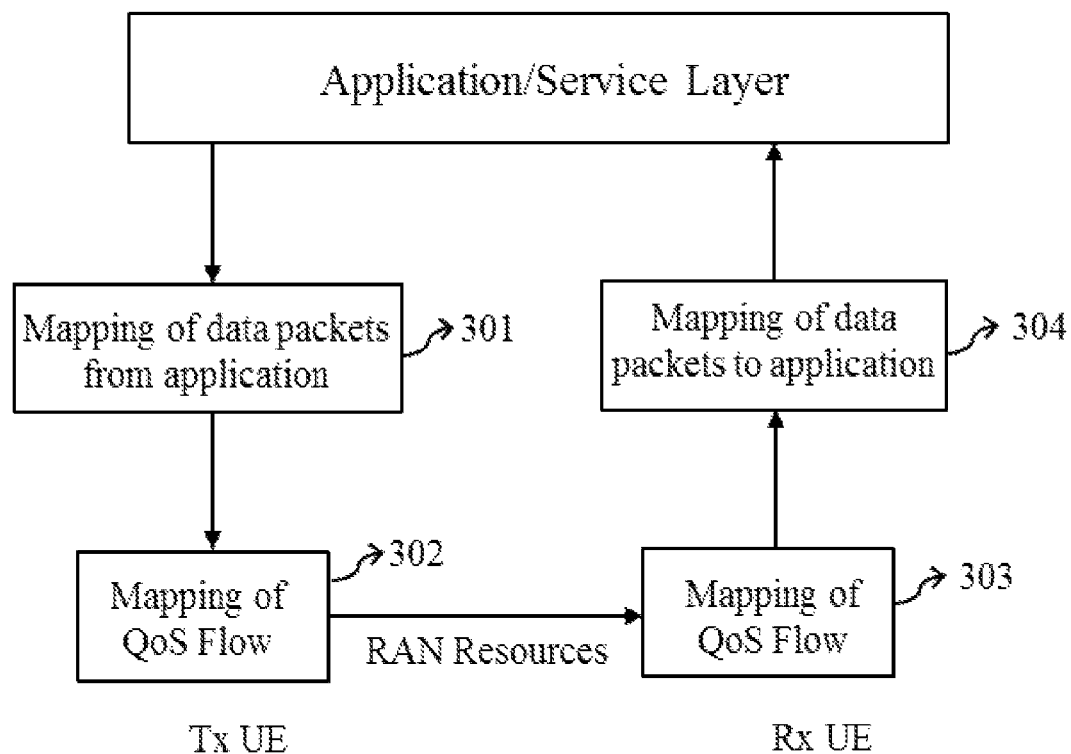
FIG. 3 illustrates an exemplary procedure of mapping data packets to QoS flows in accordance with some embodiments of the present application.

FIG. 3 illustrates an exemplary procedure of mapping data packets to QoS flows in accordance with some embodiments of the present application.

As shown in FIG. 3, generally, in a Tx UE side, data packets from applications in the Application/Service layer are transmitted between layers from high to low; while in a Rx UE side, data packets are transmitted between layers from low to high. A Tx UE can transmit data and/or information to a Rx UE via radio access network (RAN) resources.

For a QoS flow transmission between the Tx UE and Rx UE, in the Tx UE side, the data packets from applications are mapped to a QoS flow and applied QoS flow marking by QoS rules. The QoS flow is associated with a set of QoS parameters, i.e., one or more QoS parameters. All data packets in the QoS flow are marked with the same QoS flow identifier (QFI). In particular, in the exemplary mapping procedure as illustrated and shown in FIG. 3, in block 301, data packets from application in Application/Service Layer are mapped to a QoS flow(s) according to QoS rules, and QoS flow marking is applied to the data packets. In both blocks 302 and 303, during mapping of the QoS flow(s), all packets are marked with the same QFI and mapped to one SLRB. In block 304, the QoS flow(s) are mapped to data packets to application.

The Tx UE can map the QoS flow to an SLRB, and then transmit the configuration information of the SLRB to the Rx UE via one or more RAN resources. Although one QoS flow may be illustrated in some embodiments of the present application, two or more PC5 QoS flows can be mapped into one SLRB.

After receiving the configuration information of the SLRB, the Rx UE needs to establish an SLRB based on the received configuration information of the SLRB and remap the SLRB to the QoS flow intended to be transmitted by the TX UE. However, to remap an SLRB to a QoS flow, the Rx UE needs to determine to which QoS flow the SLRB is mapped and what is the associated QoS requirement for the QoS flow. Normally, the Rx UE can make this determination based on PFI (PC5 QoS flow identifier), wherein a PFI value indicates a type of a QoS flow.

However, according to the current working progress of 3GPP SA2 workgroup, PFI is allocated by a Tx UE itself. Thus, a Rx UE cannot know the specific meaning of PFI by itself, and cannot determine what type the QoS flow is. Accordingly, the Rx UE cannot remap an SLRB to a PC5 QoS flow in the Rx UE side, and also cannot deliver the corresponding data to any high layer. This problem is serious especially for groupcast and broadcast scenario in NR V2X. Thus, under a V2X communication scenario, problems concerning how to indicate a type of a QoS flow to a Rx UE and how to indicate a type of QoS flow to SLRB from a BS side need to be solved.

One solution is defining a table in 3GPP standard specification for a QoS flow, e.g., defining all possible QoS flows in a table and providing index information for all possible QoS flows. Then, the index information can be utilized for the SLRB configuration by a network or a BS, and can also be used to indicate a Rx UE how to remap data from an SLRB to a PC5 QoS flow. Generally, such kind of table should be defined in 3GPP SA2 workgroup. However, considering the agreement in 3GPP SA2 workgroup that PFI is allocated by a Tx UE itself, there is a little chance to redefine such table according to the current closed state of NR V2X WI (Work item) stage. So other solutions need to be prepared to solve the above problem.

In addition, 3GPP RAN2 workgroup has agreed that the mapping relationship between PC5 QoS flow and SLRB is configured or preconfigured by a network or a BS. A Tx UE can map a PC5 QoS flow to the corresponding SLRB based on configuration information or pre-configuration information of the network or the BS. The configuration information or pre-configuration information may be dedicated RRC signaling, SIB signaling, or pre-configuration parameter(s). However, since the PFI associated with PC5 QoS flow is allocated by a Tx UE itself, the network or the BS cannot configure or preconfigure the mapping relationship between the PC5 QoS flow and SLRB by using any index information but using detail QoS information of each QoS flow, which may cause large signaling overhead. Hence, a problem concerning how the network or the BS configures PC5 QoS flow to SLRB mapping when PFI is allocated by a Tx UE itself needs to be solved.

Referring to FIG. 3, for data packets from the application layer, the Tx UE can map the data packets to PC5 QoS flows based on QoS rules. The data packets mapped to the same QoS flow may share the same QFI. Then, the SDAP layer can perform a mapping procedure from the PC5 QoS flow to SLRB. When data packets are successfully delivered to the Rx UE, the Rx UE need to remap the data packets from SLRB to each QoS flow. Since there may be two or more PC5 QoS flows in one SLRB under a NR V2X scenario, it is necessary for the Rx UE to determine to which PC5 QoS flow the received data packets actually belong. Without the information regarding the transmitted PC5 QoS flow(s), the Rx UE cannot do the remapping either, let alone perform other subsequent behaviors.

That is to say, the Rx UE needs to be aware of the QoS parameters information or corresponding index information for the transmitted PC5 QoS flow(s). parameters associated with a QoS flow can be PC5 5G QoS identifier (5QI) (PQI), guaranteed flow bit rate (GFBR), maximum flow bit rate (MFBR), aggregated maximum bit rate (AMBR), and communication range. The parameter may include more detailed parameters. For example, PQI can be standardized or pre-configured PC5 QoS characteristics, and can be indicated through the PQI value, which includes: resource type (GBR, Delay critical GBR or Non-GBR), priority level, packet delay budget, packet error rate, averaging window (for GBR and Delay-critical GBR resource type only), maximum data burst volume (only for delay-critical GBR resource type). The standardized PQI can include {1, 2, 3, 55, 56, 57, 58, 59, 82, 83}. For non-standardized PC5 QoS characteristics, the parameters listed above are not reflected by PQI, but also should be configured as the standardized PQI. Hence, a problem concerning how a Rx UE can be aware of the corresponding QoS information for the PC5 QoS flow transmitted by Tx UE to support a remapping procedure needs to be solved.

One solution for a Rx UE to know the mapping relationship between PC5 QoS flow and SLRB by associated QoS parameters information is that a network or a BS configures or preconfigure (predefine) the mapping relationship by using detailed information in QoS parameter(s) of each QoS flow, e.g., PC5 5G QoS identifier (5QI) (PQI), guaranteed flow bit rate (GFBR), maximum flow bit rate (MFBR), aggregated maximum bit rate (AMBR), and communication range. Specifically, the network or the BS only configures or pre-configures "QoS flow to SLRB mapping information" and transmits "the QoS flow to SLRB mapping information" to a Tx UE. Then, the Tx UE transmits "the QoS flow to SLRB mapping information" to an Rx UE. "The QoS flow to SLRB mapping information" includes both index configuration information and mapping index information (the mapping index information indicates a quantization index of each QoS parameter of a set of QoS parameters of a PC5 QoS flow, and the set of QoS parameters is quantified to the mapping index information based on the index configuration information). This solution directly solves a problem that how a network or a BS can indicate "the QoS flow to SLRB mapping information" to a Tx UE. Although an Rx UE does not directly receive "the QoS flow to SLRB mapping information" from the network or the BS, this solution provides an essential step for the Rx UE to finally know "the QoS flow to SLRB mapping information."

Another solution for a Rx UE to know the mapping relationship between PC5 QoS flow and SLRB by associated QoS parameters information is that a Tx UE can indicate detailed QoS parameter(s) for the mapping to a Rx UE.

However, both of the above two solutions will cause large signaling overhead for all of network configuration, BS configuration, and QoS parameter(s) indication.

Considering the above problems, some embodiments of the present application provide a solution of indication QoS information by quantizing associated QoS parameters and indexing the quantized QoS parameters. The manners for quantizing parameters may be dividing a plurality ranges based on the value ranges of a QoS parameter. An index can be indicated to the divided range so that the range can be identified.

Accordingly, various methods and apparatuses for indicating QoS information can be provided under the above solution according to different embodiments of the present application. For example, some embodiments of the present application provide a mechanism for configuring index configuration information. Some embodiments of the present application provide a mechanism for transmitting configuration information of SLRB and mapping index information. Some embodiments of the present application provide a mechanism for remapping SLRB to a QoS flow based on mapping index information and index configuration information.

Some embodiments of the present application provide an apparatus for configuring index configuration information. Some embodiments of the present application provide an apparatus for transmitting configuration information of SLRB and mapping index information. Some embodiments of the present application provide an apparatus for remapping SLRB to a QoS flow based on mapping index information and index configuration information.

Some embodiments for configuring index configuration information provide a two-stage configuration mechanism: in the first-stage configuration, a network or a BS configures or pre-configure QoS parameters range division and indexing; and in the second-stage configuration, the network or the BS configures or pre-configures a PC5 QoS flow to SLRB mapping by using the configured QoS parameter index.

Figure 4:
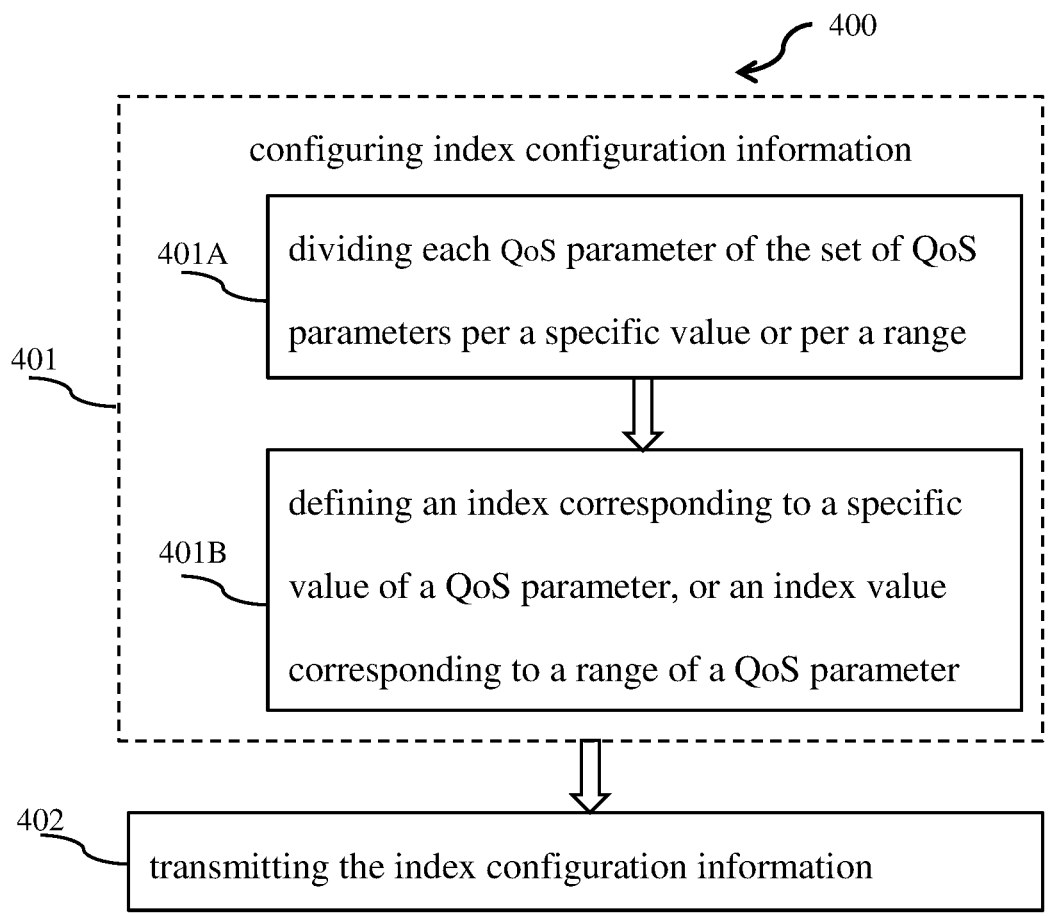
FIG. 4 illustrates an exemplary flow chart of a method for wireless communication in accordance with some embodiments of the present application.

FIG. 4 illustrates an exemplary flow chart of a method for wireless communication in accordance with some embodiments of the present application. In the exemplary method 400 as illustrated and shown in FIG. 4, in step 401, a network or a BS (e.g., BS 102 as illustrated and shown in FIGS. 1 and 2) configures index configuration information. For example, a gNB may configure the index configuration information "QoS flow to SLRB mapping" by dedicated RRC signaling, SIB, or pre-configuration. The pre-configured or predefined index configuration information can be defined the specification or preconfigured in the network side and/or UE (including Tx UE and Rx UE) side.

In step 402, the network or the BS transmits the index configuration information. For example, a gNB can transmit the index configuration information "QoS flow to SLRB mapping" by dedicated RRC signaling or SIB to a TX UE.

The index configuration information indicates a set of indexes associated with each QoS parameter within a set of QoS parameters. In some embodiments of the present application, the set of QoS parameters includes at least one of PQI, GFBR, MFBR, AMBR, and communication range.

As shown in FIG. 4, step 401 can further includes two sub-steps:

(1) dividing each QoS parameter of the set of QoS parameters per a specific value or per a range, i.e., 401A as illustrated and shown in FIGS. 4; and (2) defining an index corresponding to a specific value of a QoS parameter, or an index value corresponding to a range of a QoS parameter, i.e., 401B as illustrated and shown in FIG. 4. In some embodiments of the present application, a range of a QoS parameter which corresponds to an index value is divided according to a set of thresholds.

For example, if the set of QoS parameters include GFBR, MFBR, AMBR, and communication range, the network or the BS may configure different range(s) for each PC5 QoS parameter of the set of QoS parameters. A set of thresholds may be used to divide different parameter range(s). The set of thresholds is parameter-specific. That is, different sets of thresholds may be used for different QoS parameters to perform a division process of parameter range(s).

The dividing process of different parameter range(s) of a QoS parameter may also be named as a quantization process of the QoS parameter. Index value(s) corresponding to divided range(s) of a QoS parameter may also be named as quantization index(s). Index value(s) corresponding to a QoS parameter may be named as quantization index(s).

Details of some examples of different QoS parameters for range division and indexing are described below.

For PQI (Standardized or Pre-Configured PC5 QoS Characteristics)

The standardized PQI includes ten fixed values 1, 2, 3, 55, 56, 57, 58, 59, 82, 83, as defined by standards of 3GPP SA2 workgroup. Since these PQI values are fixed as defined in the standards of 3GPP SA2 workgroups, a network or a BS may only configure a PQI index value for each of the fixed PQI values. That is, dividing each QoS parameter of the set of QoS parameters per a specific value.

For instance, for all fixed PQI values 1, 2, 3, 55, 56, 57, 58, 59, 82, 83, the corresponding ten index values may be configured as 1, 2, 3, 4, 5, 6, 7, 8, 9, 10. In an example, these ten index values may be preconfigured or predefined, e.g., fixed in standards of 3GPP SA2 workgroup. In another example, these ten index values may be configured by the network or the BS.

Non-standardized PQI, i.e., pre-configured PC5 QoS characteristics, can include: resource type (GBR, Delay critical GBR or Non-GBR), priority level, packet delay budget, packet error rate, averaging window (for GBR and Delay-critical GBR resource type only), maximum data burst volume (only for delay-critical GBR resource type). Although the pre-configured PC5 QoS characteristics are not reflected by standardized PQI, that is, are not defined in the PQI table, or other standards of a 3GPP workgroup., they should also be configured to index values in a manner similar to those of QoS parameters "GFBR," "MFBR," "AMBR," and "communication range," while will be specifically illustrated in following contents.

QoS Flow Bit Rate

QoS flow bit rate further include: GFBR for Guaranteed Bit Rate (GBR) QoS flows, and MFBR for GBR QoS flows.
(1) For GFBR for GBR QoS Flows GFBR may be divided into several ranges by using different thresholds. That is, dividing each QoS parameter of the set of QoS parameters per a specific value or per a range. For example, the network or the BS may configure a set of GFBR thresholds $GFBR_{thre\ 1}$, $GFBR_{thre\ 2}$, ... $GFBR_{thre\ n}$. Using these GFBR thresholds, the GFBR may be divided into different ranges of $\{1 \sim GFBR_{thre\ 1}\}$, $\{GFBR_{thre\ 1} \sim GFBR_{thre\ 2}\}$, ... $\{GFBR_{thre\ n-1} \sim GFBR_{thre\ n}\}$. After the division, the network or the BS may configure index values corresponding to these divided ranges as GFBR1, GFBR2, ... GFBRn, respectively. The index values corresponding to the divided ranges of the GFBR may be named as quantization indexes. For example, index of range $\{1 \sim GFBR_{thre\ 1}\}$ can be GFBR1, index of range $\{GFBR_{thre\ 1} \sim GFBR_{thre\ 2}\}$ can be GFBR2 etc.
(2) For MFBR for GBR QoS Flows Similar to GFBR, MFBR can be divided into several ranges by using different thresholds. More specifically, the network or the BS may configure a set of MFBR thresholds $\{MFBR_{thre\ 1}, MFBR_{thre\ 2}, \ldots MFBR_{thre\ n}\}$. Using these MFBR thresholds, the MFBR may be divided into different ranges of $\{1 \sim MFBR_{thre\ 1}\}$, $\{MFBR_{thre\ 1} \sim MFBR_{thre\ 2}\}$, ... $\{MFBR_{thre\ n-1} \sim MFBR_{thre\ n}\}$. After the division, the network or the BS may configure index values corresponding to these divided ranges as MFBR1, MFBR2, ..., MFBRn, respectively. The index values corresponding to the divided ranges of the MFBR may be named as quantization indexes. For example, index of range $\{1 \sim MFBR_{thre\ 1}\}$ can be MFBR1, index of range $\{MFBR_{thre\ 1} \sim MFBR_{thre\ 2}\}$ can be MFBR2 etc.

For AMBR and Communication Range

The configuration processes of QoS parameters "AMBR" and "communication range" are similar to those of QoS parameters "GFBR" and "MFBR." Details see the above descriptions.

In some embodiments of the present application, in the exemplary method 400 as illustrated and shown in FIG. 4, a network or a BS configures mapping index information between PC5 QoS flow to SLRB. PC5 QoS flow may also be characterized by a set of QoS parameters. Each QoS parameter of PC5 QoS flow is quantified to a corresponding index value configured in the first-stage configuration. The mapping index information indicates a quantization index of each QoS parameter of the set of QoS parameters.

In some embodiments of the present application, the mapping index information may include one set index indicating a set of a specific quantization index of each QoS parameter of the set of QoS parameters, or a plurality of separated indexes indicating a specific quantization index of each QoS parameter of the set of QoS parameters. Examples are depicted below.

For NR V2X sidelink service, an exemplary PC5 QoS flow may be quantified as $\{PQI_{index}, GFBR_{index}, MFBR_{index}, AMBR_{index}, Range_{index}\}$. As described above, these five QoS parameters may be configured corresponding index value(s) in the first-stage configuration. Based on this, different PC5 QoS flow with each of the five QoS parameters corresponding to different parameter index value may be mapped to different SLRB(s).

In particular, for PC5 QoS flow to SLRB mapping, an example is $\{PQI_{index}, GFBR_{index}, MFBR_{index}, AMBR_{index}, Range_{index}\}$ to $SLRB_{index}$ mapping. A specific PC5 QoS flow to SLRB mapping may be named as a mapping item. An overall index value or a set index value may also be configured for a mapping item, as a mapping index of the mapping item. For example:

Mapping index a: $\{PQI_{index\ 1}, GFBR_{index\ 1}, MFBR_{index\ 1}, AMBR_{index\ 1}, Range_{index\ 1}\}$ to $SLRB_{index\ 1}$ Mapping index b: $\{PQI_{index\ 2}, GFBR_{index\ 2}, MFBR_{index\ 2}, AMBR_{index\ 2}, Range_{index\ 2}\}$ to $SLRB_{index\ 2}$ Mapping index c: $\{PQI_{index\ 1}, GFBR_{index\ 2}, MFBR_{index\ 4}, AMBR_{index\ 7}, Range_{index\ 1}\}$ to $SLRB_{index\ 1}$ Mapping index d: $\{PQI_{index\ 2}, GFBR_{index\ 1}, MFBR_{index\ 9}, AMBR_{index\ 11}, Range_{index\ 27}\}$ to $SLRB_{index\ 2}$

. . .

Mapping index x-1: $\{PQI_{index\ n}, GFBR_{index\ n-6}, MFBR_{index\ n-1}, AMBR_{index\ n}, Range_{index\ n-3}\}$ to $SLRB_{index\ n}$ Mapping index x: $\{PQI_{index\ n}, GFBR_{index\ n}, MFBR_{index\ n}, AMBR_{index\ n}, Range_{index\ n}\}$ to $SLRB_{index\ n}$ Wherein, both n and x are nature integer.

Although specific index values of the five QoS parameters are listed above, examples of PC5 QoS flows should not be limited, and other examples of PC5 QoS flows with different index values of the five QoS parameters may also be mapped to different SLRB.

A set index value configured for a specific mapping item (e.g., any one of "Mapping index a" to "Mapping index x") may be configured or preconfigured by a network or a BS. A set index value configured for a specific mapping item may also be named as an overall index value configured for a specific mapping item. In some embodiments of the present application, a network or a BS may configure or preconfigure mapping index information and transmit the mapping index information to both a Tx UE and an Rx UE, such as in the scenario shown in FIG. 1. In some other embodiments of the present application, a Tx UE may receive the mapping index information from a network or a BS and then transmit the mapping index information to an Rx UE, such as in the scenario shown in FIG. 2.

Figure 5:
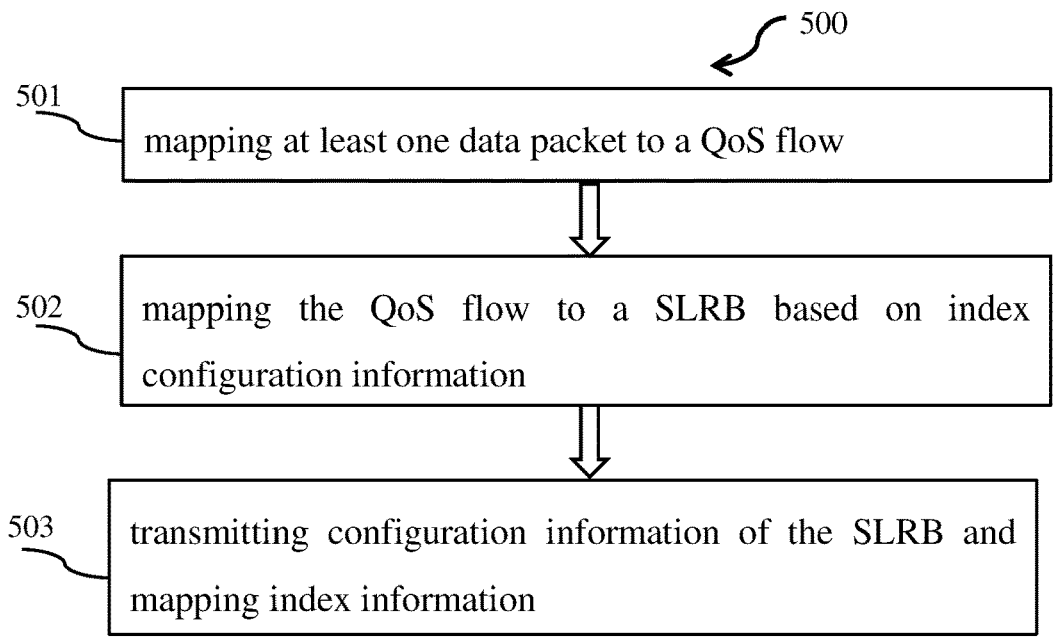
FIG. 5 illustrates another exemplary flow chart of a method for wireless communication in accordance with some embodiments of the present application.

FIG. 5 illustrates another exemplary flow chart of a method for wireless communication in accordance with some embodiments of the present application.

In the exemplary method 500 as illustrated and shown in FIG. 5, in step 501, a Tx UE (e.g., UE 101a illustrated and shown in FIGS. 1 and 2, or Tx UE as illustrated and shown in FIG. 3) maps at least one data packet to a QoS flow. In the embodiments of FIG. 5, the QoS flow is associated with a set of QoS parameters. In some embodiments of the present application, the set of QoS parameters includes at least one of PQI, GFBR, MFBR, AMBR, and communication range.

In step 502, the Tx UE maps the QoS flow to a SLRB based on index configuration information. In an example, the index configuration information is received from a network side, e.g., a BS. In another example, the index configuration information is predefined. The index configuration information may indicate a set of indexes associated with each QoS parameter of the set of QoS parameters.

In some embodiments of the present application, a set of indexes associated with each QoS parameter of the set of QoS parameters includes an index corresponding to a specific value of a QoS parameter. For example, if a QoS parameter is PQI, a set of indexes associated with PQI includes an index corresponding to a specific value of PQI value.

In some other embodiments of the present application, a set of indexes associated with each QoS parameter of the set of QoS parameters includes an index value corresponding to a range of a QoS parameter. The range of a QoS parameter may be divided according to a set of thresholds, for example, according to the configuration processes in the above descriptions.

In step 503, the Tx UE transmits configuration information of the SLRB and mapping index information. The mapping index information includes the mapping index and configured mapping relationship between the QoS flow and the SLRB. The mapping index information indicates a quantization index of each QoS parameter of the set of QoS parameters. For example, the Tx UE transmits the SLRB configuration information to a Rx UE. The Rx UE may establish the SLRB according to the SLRB configuration information.

In some embodiments of the present application, the Tx UE transmits the index configuration information. For example, the Tx UE further transmits index configuration information to a Rx UE.

The mapping index information may include "one set index" indicating a set of a specific quantization index of each parameter of the set of QoS parameters. For example, the mapping index information includes any one of "Mapping index a" to "Mapping index x" as listed above.

The mapping index information may include "a plurality of separated indexes" indicating a specific quantization index of each parameter of the set of QoS parameters. For example, the mapping index information includes all index values of the five QoS parameters of a specific PC5 QoS profiles as listed above.

In some embodiments of the present application, the mapping index information is transmitted in a header of a SDAP data PDU. Such embodiments may be named as Per-packet indication. In particular, QoS flow information may be added to a SDAP header of a SDAP data PDU. An exemplary SDAP data PDU format is illustrated and shown in FIG. 7.

For example, mapping index for an item which is configured as described above or a set of indexes for QoS parameters which are configured as described above can be added to a SDAP header for each SDAP PDU.

More specifically, with reference to FIG. 1, both UE 101a and UE 101b are within the coverage area 103 of BS 102, and thus both the Tx UE (i.e., UE 101a) and the Rx UE (i.e., UE 101b) can receive, from a network or BS, configuration or pre-configuration regarding mapping relationship(s) between a PC5 QoS flow and SLRB. When the Rx UE receives the SDAP data PDU, the Rx UE may do remapping between SLRB and PC5 QoS flow based on such kind of QoS information as well as configuration or pre-configuration received from a network or BS.

In some embodiments of the present application, the mapping index information is transmitted in a SDAP control PDU. An exemplary SDAP data PDU format is illustrated and shown in FIG. 8. Such embodiments may be named as Per-destination configuration indication from a Tx UE to a Rx UE. In particular, these embodiments introduce a new SDAP control PDU to indicate index configuration information received by a Tx UE and mapping index information between a PC5 QoS flow and SLRB. The mapping index information indicates a quantization index of each QoS parameter of a set of QoS parameters of the PC5 QoS flow, and the set of QoS parameters is quantified to the mapping index information based on the index configuration information.

More specifically, with reference to FIG. 2, UE 101a is within the coverage area 103 of BS 102, but and UE 101b is outside of the coverage area 103 of BS 102. Thus, only the Tx UE (i.e., UE 101a) can receive, from a network or a BS, index configuration information between a PC5 QoS flow and SLRB. However, the Rx UE (i.e., UE 101b) cannot receive the index configuration information from the network or the BS due to being outside of the coverage area 103. Information regarding index configuration in the Rx UE is pre-defined or pre-configured. The index configuration information received from the network or the BS and the information regarding index configuration pre-defined in the Rx UE may be mis-alignment. The Tx UE may transmit a new SDAP control PDU, which indicates index configuration information received by the Tx UE and mapping index information between a PC5 QoS flow and SLRB, to the Rx UE. After receiving the new SDAP control PDU, although the Rx UE cannot receive the index configuration information between a PC5 QoS flow and SLRB from the network or the BS, the Rx UE can do remapping between SLRB and PC5 QoS flow based on the index configuration information received by the Tx UE and mapping index information indicated in the new SDAP control PDU received from the Tx UE.

The new SDAP control PDU in these above embodiments may include a mapping index (i.e., "one set index" which indicates a set of a specific quantization index of each parameter of the set of QoS parameters, as described above) or a set of QoS parameter indexes (i.e., "a plurality of separated indexes" which indicates a specific quantization index of each parameter of the set of QoS parameters, as described above). Since the index configuration information received from the network or the BS and the information regarding index configuration pre-defined in the Rx UE may be mis-alignment, the new SDAP control PDU indication may be used to align the index configuration information between a Tx UE and a Rx UE. Such embodiments can avoid mis-alignment the index configuration information between a Tx UE and a Rx UE for different coverage states.

Details described in all other embodiments of the present application (for example, details of how to configure index configuration information, how to divide different parameter range(s), and how to index values corresponding to a specific QoS parameter or different parameter range(s) of a QoS parameter) are applicable for the embodiments as shown in FIG. 5.

Figure 6:
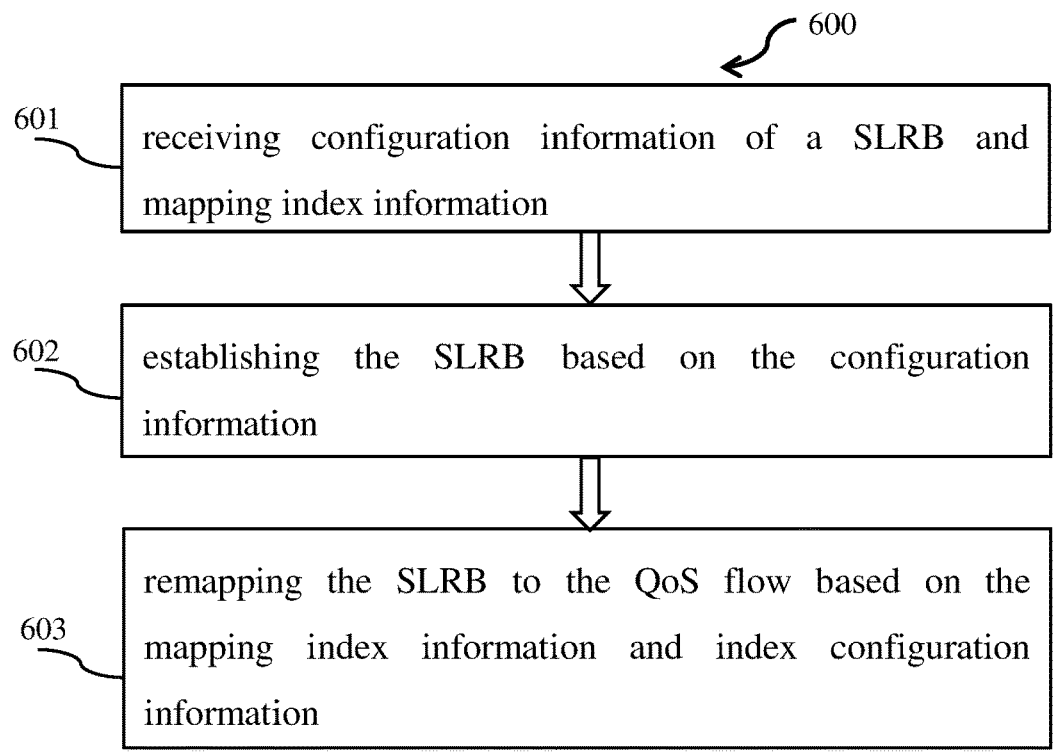
FIG. 6 illustrates yet another exemplary flow chart of a method for wireless communication in accordance with some embodiments of the present application.

FIG. 6 illustrates yet another exemplary flow chart of a method for wireless communication in accordance with some embodiments of the present application.

In the exemplary method 600 illustrated and shown in FIG. 6, in step 601, a Rx UE (e.g., UE 101b as illustrated and shown in FIGS. 1 and 2, or Rx UE as illustrated and shown in FIG. 3) receives configuration information of a SLRB and mapping index information. The mapping index information indicates a quantization index of each parameter of a set of QoS parameters, and the set of QoS parameters is associated with a QoS flow from which the SLRB is mapped.

In step 602, the Rx UE establishes the SLRB based on the configuration information. In step 603, the Rx UE remaps the SLRB to the QoS flow based on the mapping index information and index configuration information. The index configuration information indicates a set of indexes associated with each parameter of the set of QoS parameters.

In some embodiments of the present application, the Rx UE receives the index configuration information. For example, the Rx UE receives the index configuration information from a Tx UE. In another example, the Rx UE receives the index configuration information from a network side, e.g., a BS. The index configuration information may be predefined.

Details described in all other embodiments of the present application (for example, details of how to configure index configuration information, how to divide different parameter range(s), and how to index values corresponding to a specific QoS parameter or different parameter range(s) of a QoS parameter) are applicable for the embodiments as shown in FIG. 6.

FIG. 7 illustrates an exemplary service data adaptation protocol (SDAP) data packet data unit (PDU) format in accordance with some embodiments of the present application.

The SDAP data PDU as illustrated and shown in FIG. 7 is similar to a SDAP data PDU defined in 3GPP standards. The first field of a SDAP header is D/C field, which indicates whether the SDAP PDU is a data PDU or a control PDU. DATA from line 2 to the bottom line of the SDAP data PDU in FIG. 7 represent data carried in the data PDU. The difference between the SDAP data PDU in FIG. 7 and a standard SDAP data PDU lies in the second field of the SDAP header.

The second field of the SDAP header of the embodiments of FIG. 7 includes mapping index information. The mapping index information may include a mapping index (i.e., "one set index" which indicates a set of a specific quantization index of each parameter of the set of QoS parameters, as described above) or a set of QoS parameter indexes (i.e., "a plurality of separated indexes" which indicates a specific quantization index of each parameter of the set of QoS parameters, as described above).

For instance, the second field of the SDAP header includes: one set index indicating a set of a specific quantization index of each QoS parameter of a set of QoS parameters, or a plurality of separated indexes indicating a specific quantization index of each QoS parameter of the set of QoS parameters.

Details described in the embodiments as illustrated and shown in FIGS. 4-6, especially, contents related to the mapping index information, are applicable for the embodiments as illustrated and shown in FIG. 7. Moreover, details described in the embodiments as illustrated and shown in FIG. 7 are applicable for all the foregoing embodiments shown in FIGS. 4-6.

FIG. 8 illustrates an exemplary SDAP control PDU format in accordance with some embodiments of the present application.

The SDAP control PDU illustrated and shown in FIG. 8 is similar to a SDAP control PDU defined in 3GPP standards. The first field of a SDAP header is D/C field, which indicates whether the SDAP PDU is a data PDU or a control PDU. The difference between the SDAP control PDU in FIG. 8 and a standard SDAP control PDU lies in the second field of the SDAP header.

The second field of the SDAP header of the embodiments of FIG. 8 includes mapping index information. The mapping index information may include both mapping index and configured mapping relationship, when a Tx UE and a Rx UE are mis-alignment due to different coverage states.

Details described in the embodiments as illustrated and shown in FIGS. 4-7, especially, contents related to the mapping index information, are applicable for the embodiments as illustrated and shown in FIG. 8. Moreover, details described in the embodiments as illustrated and shown in FIG. 8 are applicable for all the foregoing embodiments of FIGS. 4-6.

Figure 9:
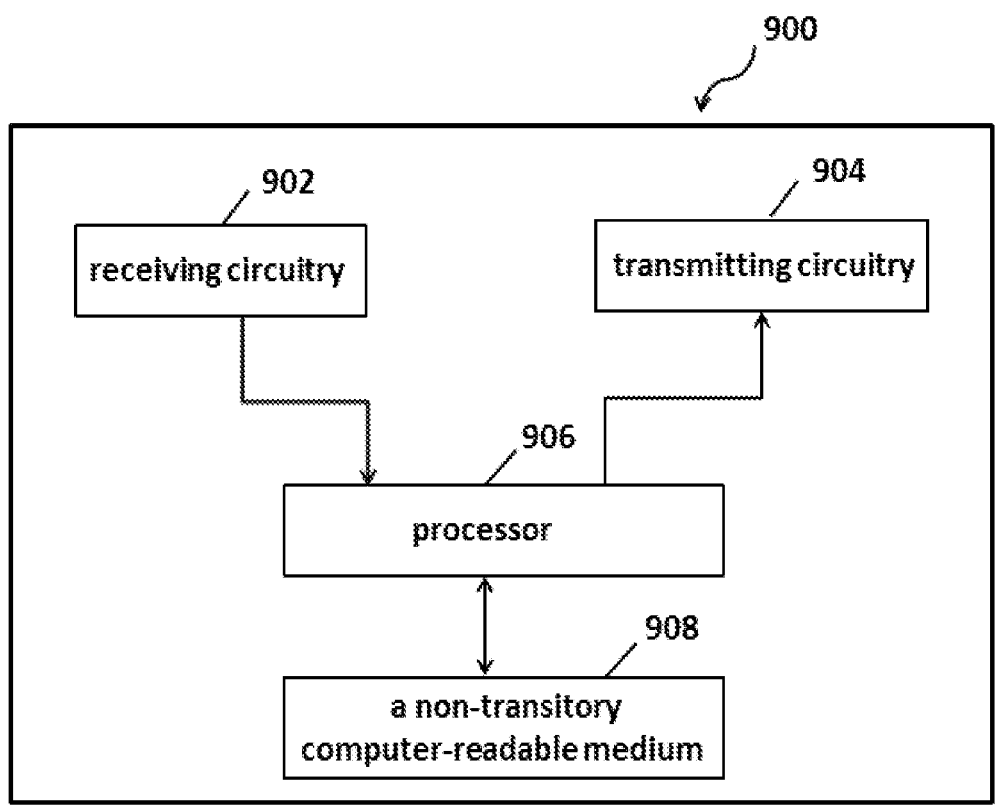
FIG. 9 illustrates a block diagram of an exemplary apparatus in accordance with some embodiments of the present application.

FIG. 9 illustrates a block diagram of an exemplary apparatus in accordance with some embodiments of the present application. Referring to FIG. 9, the apparatus 900 includes a receiving circuitry 902, a transmitting circuitry 904, a processor 906, and a non-transitory computer-readable medium 908. The processor 906 is coupled to the non-transitory computer-readable medium 908, the receiving circuitry 902, and the transmitting circuitry 904.

It is contemplated that some components are omitted in FIG. 9 for simplicity. In some embodiments, the receiving circuitry 902 and the transmitting circuitry 904 may be integrated into a single component (e.g., a transceiver).

In some embodiments, the non-transitory computer-readable medium 908 may have stored thereon computer-executable instructions to cause a processor to implement the operations with respect to BS(s) as described above. For example, upon execution of the computer-executable instructions stored in the non-transitory computer-readable medium 908, the processor 906 and the transmitting circuitry 904 perform the method of FIG. 4, including: dividing each QoS parameter of the set of QoS parameters per a specific value or per a range; defining an index corresponding to a specific value of a QoS parameter, or an index value corresponding to a range of a QoS parameter; and transmitting the index configuration information.

In some embodiments, the non-transitory computer-readable medium 908 may have stored thereon computer-executable instructions to cause a processor to implement the operations with respect to Tx UE(s) as described above. For example, upon execution of the computer-executable instructions stored in the non-transitory computer-readable medium 908, the processor 906 and the transmitting circuitry 904 perform the method of FIG. 5, including: mapping at least one data packet to a QoS flow, mapping the QoS flow to a SLRB based on index configuration information, and transmitting configuration information of the SLRB and mapping index information.

In some embodiments, the non-transitory computer-readable medium 908 may have stored thereon computer-executable instructions to cause a processor to implement the operations with respect to Rx UE(s) as described above. For example, upon execution of the computer-executable instructions stored in the non-transitory computer-readable medium 908, the processor 906 and the receiving circuitry 902 perform the method of FIG. 6, including: receiving configuration information of a SLRB and mapping index information; establishing the SLRB based on the configuration information; and remapping the SLRB to the QoS flow based on the mapping index information and index configuration information.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) comprising:
   at least one memory; and
   at least one processor coupled with the at least one memory and configured to cause the UE to:
      map at least one data packet to a quality of service (QoS) flow, wherein the QoS flow is associated with a set of QoS parameters; and
      map the QoS flow to a sidelink radio bearer (SLRB) based on index configuration information, wherein the index configuration information indicates a set of indexes associated with each QoS parameter of the set of QoS parameters, wherein the set of indexes associated with each QoS parameter of the set of QoS comprises an index corresponding to a specific value of a QoS parameter, or an index value corresponding to a range of a QoS parameter; and
      transmit configuration information of the SLRB and mapping index information, wherein the mapping index information indicates a quantization index of each QoS parameter of the set of QoS parameters and is transmitted in a header of a service data adaptation protocol (SDAP) data packet data unit (PDU).

2. The UE of claim 1, wherein the set of QoS parameters comprises at least one of: PC5 5G QoS identifier (5QI) (PQI), guaranteed flow bit rate (GFBR), maximum flow bit rate (MFBR), aggregated maximum bit rate (AMBR), and communication range.

3. The UE of claim 1, wherein the range of a QoS parameter is divided according to a set of thresholds.

4. The UE of claim 1, wherein the mapping index information is transmitted in a service data adaptation protocol (SDAP) control packet data unit (PDU).

5. The UE of claim 4, wherein the at least one processor is further configured to cause the UE to transmit the index configuration information.

6. The UE of claim 1, wherein the mapping index information comprises: one set index indicating a set of a specific quantization index of each QoS parameter of the set of QoS parameters, or a plurality of separated indexes indicating a specific quantization index of each QoS parameter of the set of QoS parameters.

7. A user equipment (UE) comprising:
   at least one memory; and
   at least one processor coupled with the at least one memory and configured to cause the UE to:
      receive configuration information of a sidelink radio bearer (SLRB) and mapping index information, wherein the mapping index information indicates a quantization index of each QoS parameter of a set of QoS parameters and is received in a header of a service data adaptation protocol (SDAP) data packet unit (PDU), and the set of QoS parameters is associated with a QoS flow from which the SLRB is mapped; and establish the SLRB based on the configuration information; and remap the SLRB to the QoS flow based on the mapping index information and index configuration information, wherein the index configuration information indicates a set of indexes associated with each QoS parameter of the set of QoS parameters and the set of indexes associated with each QoS parameter of the set of QoS comprises an index corresponding to a specific value of a QoS parameter, or an index value corresponding to a range of a QoS parameter.

8. The UE of claim 7, wherein the set of QoS parameters comprises at least one of: PC5 5G QoS identifier (5QI) (PQI), guaranteed flow bit rate (GFBR), maximum flow bit rate (MFBR), aggregated maximum bit rate (AMBR), and communication range.

9. The UE of claim 7, wherein the range of a QoS parameter is divided according to a set of thresholds.

10. The UE of claim 7, wherein the mapping index information is received in a service data adaptation protocol (SDAP) control packet data unit (PDU).

11. The UE of claim 7, wherein the mapping index information comprises: one set index indicating a set of a specific quantization index of each QoS parameter of the set of QoS parameters, or a plurality of separated indexes indicating a specific quantization index of each QoS parameter of the set of QoS parameters.

12. A base station comprising:
at least one memory; and
at least one processor coupled with the at least one memory and configured to cause the base station to:
configure index configuration information, wherein the index configuration information indicates a set of indexes associated with each QoS parameter of a set of QoS parameters, wherein the set of indexes associated with each QoS parameter of the set of QoS comprises an index corresponding to a specific value of a QoS parameter, or an index value corresponding to a range of a QoS parameter; and transmits the index configuration information,
wherein the at least one processor causing the base station to configure the index configuration information comprises:
dividing each QoS parameter of the set of QoS parameters per a specific value or per a range; and
defining an index corresponding to a specific value of a QoS parameter, or an index value corresponding to a range of a QoS parameter.

13. The base station of claim 12, wherein the set of QoS parameters comprises at least one of: PC5 5G QoS identifier (5QI) (PQI), guaranteed flow bit rate (GFBR), maximum flow bit rate (MFBR), aggregated maximum bit rate (AMBR), and communication range.

14. The base station of claim 12, wherein the range of a QoS parameter is divided according to a set of thresholds.

15. The base station of claim 12, wherein the at least one processor is further configured to cause the base station to map index information, and the mapping index information indicates a quantization index of each QoS parameter of the set of QoS parameters.

16. The base station of claim 15, wherein the mapping index information comprises: one set index indicating a set of a specific quantization index of each QoS parameter of the set of QoS parameters, or a plurality of separated indexes indicating a specific quantization index of each QoS parameter of the set of QoS parameters.

* * * * *